Figure 1:
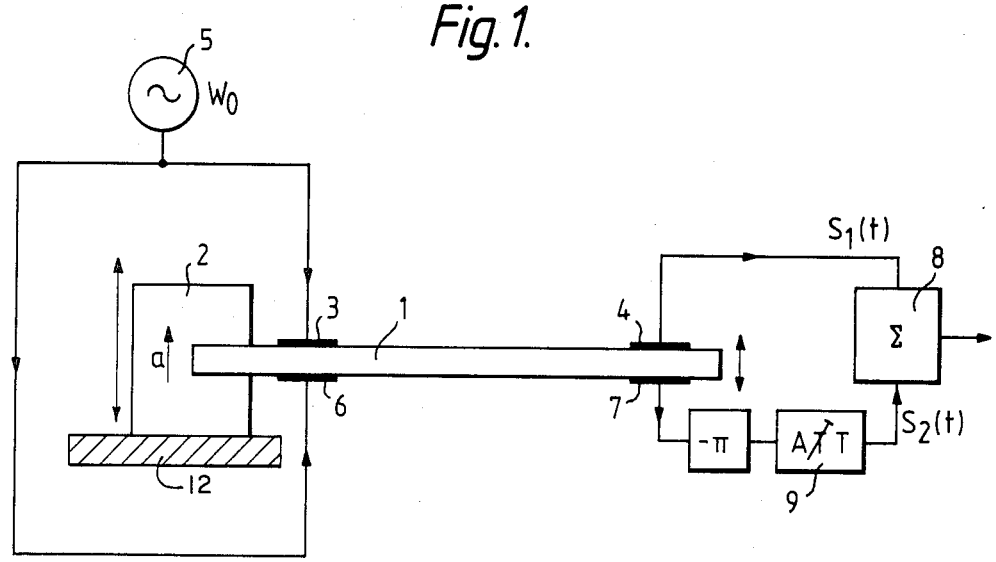

United States Patent [19]

Dwyer et al.

[11] Patent Number: 4,621,530
[45] Date of Patent: Nov. 11, 1986

[54] SURFACE ACOUSTIC WAVE ACCELEROMETER

[75] Inventors: Douglas F. G. Dwyer, Bishops Stortford; David E. Bower, London, both, England

[73] Assignee: Standard Telephones and Cables Public Limited Company, London, England

[21] Appl. No.: 630,672

[22] Filed: Jul. 13, 1984

[30] Foreign Application Priority Data

Jul. 14, 1983 [GB] United Kingdom ............... 8319103

[51] Int. Cl.[4] ............................................. G01P 15/09
[52] U.S. Cl. .............................. 73/517 R; 73/517 AV; 310/329
[58] Field of Search ............... 73/517 R, 517 AV, 651, 73/516 R; 310/313 R, 313 B, 329, 330

[56] References Cited

U.S. PATENT DOCUMENTS

| | | | |
|---|---|---|---|
| 3,848,144 | 11/1974 | Schissler | 73/517 R |
| 3,863,497 | 2/1975 | van de Vaart et al. | 73/517 R |
| 3,878,477 | 4/1975 | Dias et al. | 310/313 B |
| 4,306,456 | 12/1981 | Maerfeld | 73/517 R |
| 4,333,342 | 6/1982 | Gilden et al. | 73/516 R |

FOREIGN PATENT DOCUMENTS 2117115A 10/1983 United Kingdom ............. 73/517 R

Primary Examiner—Stewart J. Levy
Assistant Examiner—John E. Chapman, Jr.
Attorney, Agent, or Firm—Kerkam, Stowell, Kondracki & Clarke

[57] ABSTRACT

A differential surface acoustic wave (SAW) accelerometer comprises a resilient beam 1 one end of which is clamped in a support 2. Opposite faces of the beam are provided with SAW transducers 3, 4 and 6, 7 which respectively form delay lines driven by oscillator 5. Means are introduced for setting the beam into a low frequency mechanical flexural oscillation. The two outputs are connected in antiphase so that under conditions of no acceleration null points in the output waveform will be equally spaced. During acceleration the time intervals between successive nulls will become unequal.

14 Claims, 2 Drawing Figures

SURFACE ACOUSTIC WAVE ACCELEROMETER

This invention relates to accelerometers of the type in which a resilient beam is secured in a mount so that movement of the mount results in inertial bending of the beam, the beam being provided with surface acoustic wave (SAW) devices, the propagation characteristics of which change as the beam bends.

Such an accelerometer is described in our co-pending British application No. 8208434 (published British application No. 2,117,115A). In particular, there is described therein an embodiment in which a pair of SAW devices are used, one on either side of the beam together with two separate oscillators, the frequencies of which are controlled by a respective SAW device. This differential SAW accelerometer provides a low cost convenient method of measuring acceleration for sub-inertial navigation purposes. However, any differences in the two oscillator maintaining amplifiers will give rise to errors as a function of temperature and time.

According to the present invention there is provided a differential SAW accelerometer of the type in which a resilient beam, secured in a mount so that movement of the mount results in inertial bending of the beam, is provided with a pair of SAW devices, one on either side of the beam, operating in a differential mode, wherein the SAW devices are connected such that their outputs are in antiphase and are balanced in amplitude under conditions of zero acceleration, the accelerometer including means for setting the beam into a mechanical flexural oscillation which is superposed on the movement of the beam due to acceleration forces.

Figure 2:
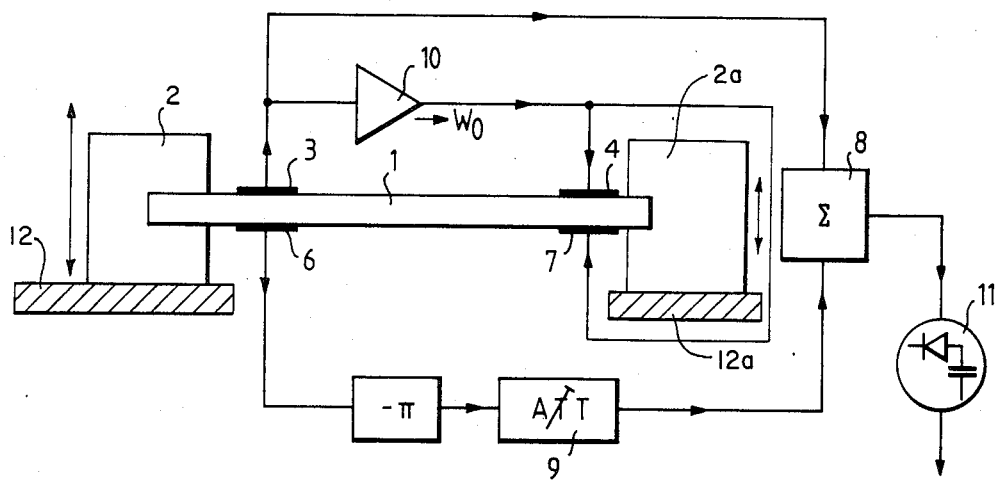

Embodiments of the invention will now be described with reference to the accompanying drawings, in which:

FIG. 1 illustrates a vibrating cantilever differential SAW accelerometer, and FIG. 2 illustrates a convenient means of generating a suitable R.F. signal synchronous with the devices.

In the arrangement shown in FIG. 1, which illustrates a first embodiment of the invention, a resilient quartz beam 1 is clamped at one end in a support 2 so that the beam forms a cantilever or semi-beam structure. Electroacoustic transducers 3,4 and 6,7 are provided on both opposite surfaces or faces of the beam 1 whereby surface acoustic waves can be propagated between transducer 3 in the surface region of the quartz beam and transducer 4, and similarly propogated between transducers 6 and 7. Transducers 3 and 6 are driven by a stable oscillator 5. The outputs of the SAW devices are summed in antiphase by a summing circuit 8. A variable attenuator 9 is included for calibration purposes. Surface acoustic wave absorption may be provided at each end of the beam. Preferably, the SAW devices formed by transducers 3, 4 and transducers 6, 7 are substantially of the same nominal frequency and delay. The SAW devices may be incorporated into electrical circuits as either delay lines or resonators. In a balance condition, the outputs $S_1(t)$ and $S_2(t)$ of the SAW devices are arranged to be in antiphase and equal in amplitude, so that the summed output signals will cancel. If the support 2 is moved in a direction normal to the plane of the beam 1, with an acceleration a, the beam 1 bends. This bending causes the surface acoustic wave path length between the transducers on each side of the beam to change. A differential strain will then be introduced in the two delay lines formed by the two transducer pairs 3, 4 and 6, 7, and an unbalance in the relative phase $\phi_1$ and $\phi_2$ of the output signals will occur. This phase difference is difficult to measure directly with high accuracy.

Therefore means are introduced for setting the beam into mechanical flexural oscillation at a low frequency, which is superposed on the movement of the beam due to acceleration forces. Typically this may be achieved by mounting the support 2 on a vibrating acoustic device 12. Each time the beam passes through the position where the two SAW devices are of equal length then $\phi_1 = \phi_2$ and no RF signal will appear at the summed output. On either side of this position $\phi_1 \neq \phi_2$ and there will be a differential output produced. Under conditions of no acceleration the null points in the output waveform will occur at equal intervals of time. This signal can be detected in an envelope detector and converted to a rectangular waveform which will provide a square wave signal, the "mark-to-space" ratio, i.e., the ratio of pulse duration to the time between successive pulses, of which is 1:1 in the balanced condition, i.e. no acceleration. Under conditions of acceleration $\phi_1 \neq \phi_2$ and the mark-to-space ratio will change, the time intervals between successive null points becoming unequal. Digital means (not shown) can be used to determine the mark-to-space ratio with high accuracy and can provide an output signal with a known relationship to acceleration.

In the alternative arrangement shown in FIG. 2 the SAW device constituted between transducers 3 and 4 is incorporated in a feedback loop of an amplifier 10 to generate an RF signal of frequency $W_o$. This RF signal is also applied to transducer 7. The outputs from transducers 3 and 6 are summed in antiphase and detector 11 converts the output to a rectangular waveform.

As an alternative to the single mount cantilevered beam arrangement, the resilient beam 1 may be clamped at both ends in support members 2, 2a, as shown in FIG. 2, and the support members may be mounted on corresponding vibrating acoustic devices 12, 12a, which are arranged such that movement may be imparted to both supports in unison to set the beam into said superposed flexural oscillation.

I claim:

1. A differential SAW accelerometer comprising a resilient beam, the beam being secured in a mount so that movement of the mount results in inertial bending of the beam, a pair of SAW devices, one on either side of the beam, the SAW devices being operated in a differential mode and having outputs that are in antiphase and are balanced in amplitude under conditions of zero acceleration, means for setting the beam into a mechanical flexural oscillation which is superposed on the movement of the beam due to acceleration forces, and means for combining the outputs of the SAW devices to produce a resultant output indicative of acceleration.

2. An accelerometer according to claim 1 wherein the resilient beam is a cantilever clamped at one end in a support means, the support means being mounted on an acoustic device whereby movement may be imparted to the support means to set the beam into flexural oscillation.

3. An accelerometer according to claim 1 wherein the resilient beam is clamped at both ends in support members, both of which are mounted on acoustic devices, whereby movement may be imparted to both supports in unison to set the beam into said superposed flexural oscillation.

4. An accelerometer according to claim 1 wherein the SAW devices are substantially of the same nominal frequency and delay.

5. An accelerometer according to claim 4 wherein the SAW devices are delay lines.

6. An accelerometer according to claim 4 wherein the SAW devices are resonators.

7. A method of operating a SAW accelerometer of the type having two SAW devices, one on either side of a resilient beam, operating in a differential mode with the outputs of the SAW devices connected in antiphase and balanced in amplitude under conditions of zero acceleration, non-zero acceleration forces producing movement of the beam, comprising setting the beam into mechanical flexural oscillation which is superposed on the movement of the beam due to acceleration forces, converting the outputs to a sequence of pulses, and measuring the ratio of pulse duration to the time between successive pulses to determine acceleration.

8. A method according to claim 7, wherein said setting the beam into mechanical flexural oscillation comprises imposing a low frequency movement to one end of the beam.

9. A method according to claim 7, wherein said setting the beam into mechanical flexural oscillation comprises moving both ends of the beam in unison.

10. A method according to claim 7, wherein said converting comprises combining the outputs of the SAW devices to produce a combined output signal, detecting the combined output signal, and converting the detected signal to a rectangular waveform.

11. A differential SAW accelerometer comprising a resilient beam; means for supporting the bean so that movement of the beam due to acceleration forces produces inertial bending of the beam; a pair of SAW devices disposed on opposite sides of the beam, the SAW devices having outputs which are in antiphase and are balanced in amplitude under conditions of zero acceleration; means for converting the outputs to a sequence of pulses; means for imparting to the beam a mechanical flexural oscillation which is superposed on the movement of the beam due to acceleration forces; and means responsive to the converting means for measuring the ratio of pulse duration to the time between successive pulses in said pulse sequence to determine acceleration.

12. An accelerometer according to claim 11, wherein said supporting means comprises a support member connected to one end of the beam such that the beam is cantilevered, and the imparting means comprises means for imparting movement to said support member.

13. An accelerometer according to claim 11, wherein the supporting means comprises first and second support members for supporting opposite ends of the beam, and the imparting means comprises means for imparting movement to the first and second support members in unison so as to impart said superposed flexural oscillation on said beam.

14. An accelerometer according to claim 11, wherein said converting means comprises means for combining the outputs of the SAW devices to produce a combined output signal, and means for converting the output signal to a rectangular waveform.

* * * * *